United States Patent [19]

Meier

[11] Patent Number: 4,759,623

[45] Date of Patent: Jul. 26, 1988

[54] ELECTROOPTICAL DISTANCE MEASURING APPARATUS

[75] Inventor: Dietrich Meier, Erlinsbach, Switzerland

[73] Assignee: Kern & Co. AG, Aarau, Switzerland

[21] Appl. No.: 872,527

[22] Filed: Jun. 10, 1986

[30] Foreign Application Priority Data

Jun. 12, 1985 [CH] Switzerland ............... 2474/85

[51] Int. Cl.[4] ............... G01C 3/08; H01S 3/00
[52] U.S. Cl. ............... 356/5; 332/7.51
[58] Field of Search ............... 356/5; 332/7.51

[56] References Cited

U.S. PATENT DOCUMENTS 3,547,539 12/1970 Froome et al. ............... 356/5
4,380,391 4/1983 Buser et àl. ............... 356/5

*Primary Examiner*—Stephen C. Buczinski
*Attorney, Agent, or Firm*—Michael Zall; Edward Weingram; Don Boles

[57] ABSTRACT

For electrooptical measurement of distance with modulation of light external to the light source (1) a modulator system (5, 7, 8, 11) with low sensitivity to temperature and with a low modulating voltage is disclosed. The temperature dependence of the static birefringence of a modulating crystal (7) is compensated by passing the modulated light beam (6), after traversing the crystal (7), a quarterwave plate (11), the measured path (9) and the quarterwave plate (11) again—a second time through the crystal (7) with its polarization rotated by 90°. The light beam returning from the measured path is separated from its source (1) by means of a polarizing beam splitter (5).

8 Claims, 4 Drawing Sheets

ELECTROOPTICAL DISTANCE MEASURING APPARATUS

BACKGROUND OF THE INVENTION

This invention relates to an electrooptical distance measuring apparatus.

In the prior art electrooptical distance measuring apparatus using the propagation velocity of light in space or in air is well known in various types. Most broadly used are instruments with sinusoidal modulation of the brightness of a light beam. After having travelled twice the measured distance up to an optical reflector and back again said modulation undergoes a phase shift which is measured by optical and electric means in dependence of the distance. After recent progress in the development of electric time measurement techniques the time of propagation of single light impulses or flashes also has been measured once or repetitively for determining distance. Up to now less frequently used are instruments for distance measurement according to the so called toothed-wheel method (A. H. L. Fizeau, 1849). Originally this method consisted of periodically interrupting a beam of light by means of a toothed-wheel, transmitting the interrupted beam to a reflector and after retroreflection periodically interrupting said beam a second time by the same toothed-wheel. Due to its retardation, the light beam, with a convenient number of revolutions per minute of the toothed-wheel, on its return will hit a tooth instead of a gap and be thus blocked from obervation. From the number of revolutions for this case the time of travel of the beam is calculated.

According to the state of the art, electrooptical crystals are used instead of the toothed-wheel (see U.S. Pat. No. 3,424,531 to P. L. Bender et al.). Such crystals instead of interruptions produce a periodic modulation of elliptical polarization of the light beam.

A linearly polarized beam with suitable orientation of its plane of polarization with respect to the axes of the electrooptic crystal is modulated with a sinusoidal electric signal of some 100 MHz. If retroreflected beam components upon their second pass through the crystal in reverse direction meet the same phase of modulation as on their first pass, the original steady state linear polarization is restored and behind a suitable optical analyzer complete darkness of those beam components is observed. This is the case when at each moment the total number of modulation wavelengths present over twice the measured distance from the crystal to the retroreflector and back is an integer number. If it is not, the brightness of the beam will not be minimum, but then a minimum may be obtained by changing the measured distance or the wavelength of modulation. Both methods are state of the art (see also GB Pat. No. 919,368 to K. D. Froome et al.).

With one known apparatus for distance measurement of the above type, the modulating crystal is made from KDP, which needs a rather high a.c. voltage for modulation (see F. S. Chen, Modulators for optical communications, Proc. IEEE, October 1970, page 1445). It is known that lithium-niobate crystals (Li Nb O$_3$) for an equal degree of light modulation need a substantially lower voltage of modulation. This advantage is however counterbalanced by a substantially larger change of static birefringence of Li Nb O$_3$ with temperature than for KDP, this type of birefringence being effective also for dynamic modulation. There have been, accordingly, numerous efforts to reduce the disturbing effects of changes in temperature on Li Nb O$_3$-modulators (see F. S. Chen, Proc. IEEE, 1970, P. 1443). One way was to cut the modulator crystal into two components with a halfwaveplate in between or a turn by 90° of the second component with respect to the first one (see F. S. Chen, Proc. IEEE, 1970, P. 1446). These methods are helpful only if the spatial and temporal temperature distribution is equal for both crystal components.

One object of the present invention therefore, is to provide an electrooptical distance measuring apparatus with a crystal modulator having improved compensation of changes of temperature. Another object is to provide such apparatus with a low voltage electrooptic modulator. Another object is to produce a distance measuring apparatus with a high accuracy of measurement.

The present invention is directed toward satisfying these objects with an apparatus comprising a modulating means with an electrooptic crystal and a quarterwave plate. These are arranged so, that the modulated light traverses at first the crystal and then successively the quarterwave plate, twice the measured distance, the quarterwave plate again in reverse direction and finally again the crystal. This modulator is mounted with a polarizing beam splitter in front of the electrooptic crystal. The modulated light, on its first passage of the beam splitter, being linearly polarized, after its first and second passage of the quarterwave plate and the crystal will be separable from its source and may be directed to a detecting means.

These objects and many other advantages of the present invention will be readily apparent to one skilled in the pertinent art from the following detailed description of the preferred embodiments thereof and the claims when considered in conjunction with the drawings.

DETAILED DESCRIPTION OF THE PREFERRED EMBODIMENTS

Figure 1:
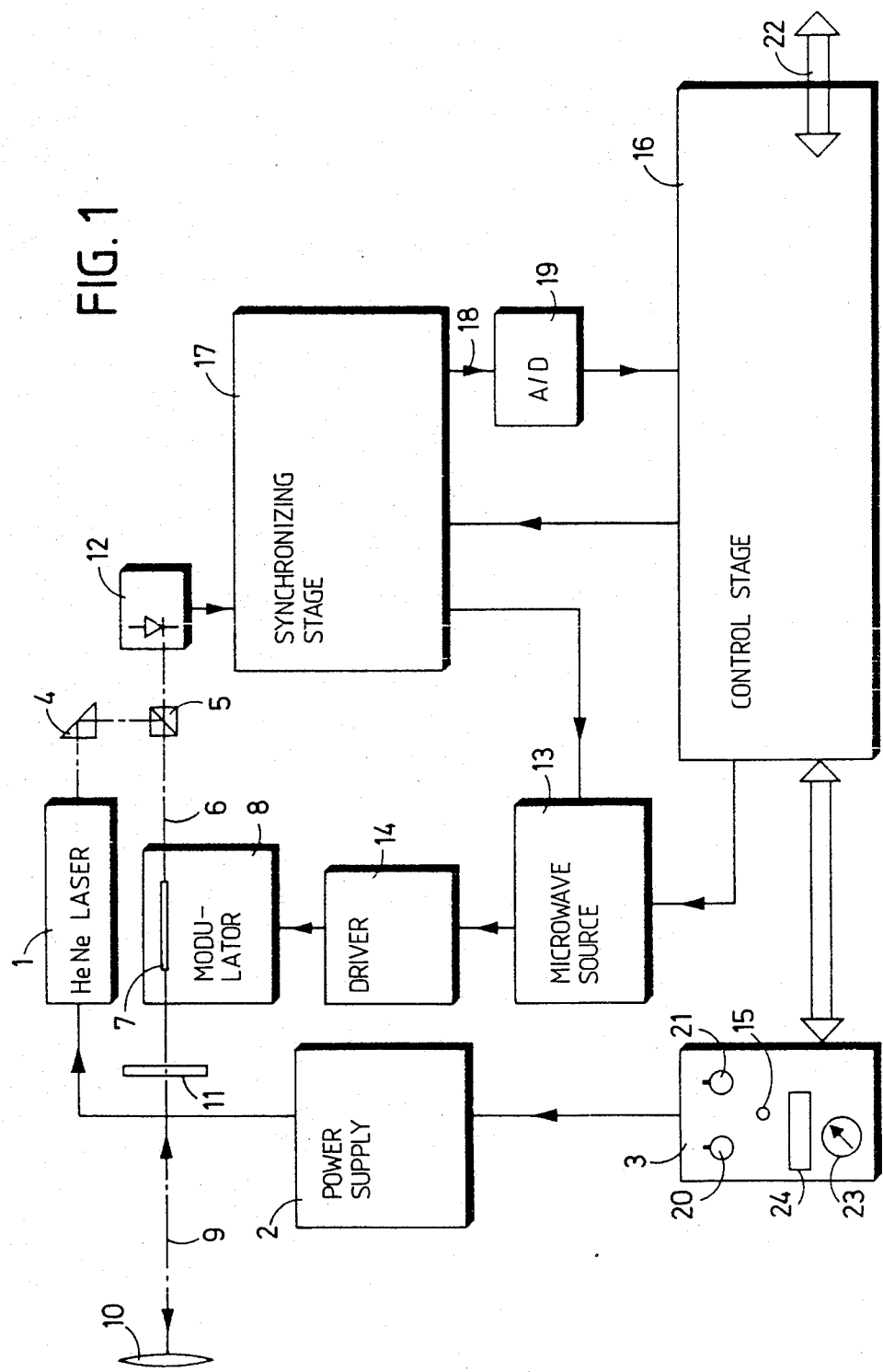
FIG. 1 is a schematic representation of a preferred embodiment of an electrooptic distance measuring apparatus according to the present invention.

In FIG. 1 a Helium-Neon laser 1 is powered by a power supply 2, the latter being controlled by a service panel 3. The beam of laser 1 is deviated by a deviating prism 4 to a polarizing beam splitter 5 where it is linearly polarized. Now, the linearly polarized beam 6 passes an electrooptic modulating crystal 7 being mounted within a line-resonator of a modulator 8. Thus, the laser beam having a modulated elliptic polarization is transmitted by a lens 10 over the measured path with a typical length between some meters and some kilometers. The other end of the measured path is terminated by a reflector (not shown) which reflects the modulated laser beam 9 back to the modulating crystal 7. Between the modulating crystal 7 and the lens 10 the outgoing and returning laser beam 9 passes twice a quarterwave plate 11. If the modulator 8 would be without effect therefore, the returning laser beam 6 would have its plane of polarization rotated by 90° with respect to the outgoing beam. So, the former beam would pass the polarizing beam splitter 5 in a straight line and hit a photoelectric receiver 12.

The modulating crystal 7 is made of Lithium Niobate ($LiNbO_3$). It is driven by a modulating signal of a modulating frequency variably selectable from a given set of frequencies. The modulating signal is supplied by a microwave source 13 via a driver amplifier 14. If the periodic modulating signal has a frequency of e.g. 500 MHz, a modulation wave of length 60 cm is successively transmitted onto the measured path after each 2 ns elapsed time. In case of a measured path with a double length of an integer multiple of 60 cm, the modulation phases of the outgoing beam and returning beam at the crystal 7 output to the measured path are equal at any moment. The returning beam is then completely demodulated by crystal 7 and emerges with a constant linear polarization again. Due to the quarterwave plate 11 the plane of polarization has been rotated by 90° and the photoelectric receiver 12 gets a constant maximum of brightness.

The modulating effect of the $LiNbO_3$ crystal 7 is particularly sensitive to temperature changes. Therefore, modulation and demodulation is done, according to the present invention, by the same crystal 7 with the so called round trip mode. Effects of static birefringence of crystal 7 are compensated at each moment, because due to the quarterwave plate 11 the plane of polarization of the returning beam is rotated by 90° with respect to the outgoing one. If the modulating frequency of microwave source 13 is varied, the ratio of the double length of the measured path to modulation wavelength is no longer an integer, and the brightness sensed by the photoelectric receiver 12 shows a peculiar periodic change with maxima and rather pronounced minima.

During the course of measurement described more in detail below, after pressing a start button 15 on service panel 3, a sequence of rising or falling modulation frequencies is selected at the microwave source 13 by a control stage 16. Each one of the modulating signals with a selected frequency is frequency-modulated or wobbled with a 1 kHz wobble and a frequency shift of ±5 kHz or ±25 kHz by a control signal from a synchronizing stage 17. For short distances, the above mentioned minima being less pronounced, the larger ±25 kHz wobble is used for sampling the periodic change of the receiver 12 output. This output signal is sampled by two detection channels I and II with frequency difference of 10 kHz or 50 kHz under control of the synchronizing stage 17. By this process the modulation frequencies corresponding to successive signal minima are found by means of a program controlling stage 16. This program provides for mean frequency results, taking into account variations of the measured path due to atmospheric effects.

From the above frequency results, the length of the measured path is calculated by a microprocessor of control stage 16 as described below. If the double length of the measured path is an integer multiple of the modulation wavelength, the propagation time 2T of the beam 9 of laser 1 from modulator 7 to the reflector and back is an integer multiple gamma of the modulation period t=2 ns, thus 2T=gamma t. However, the value of the integer gamma is still unknown. This uncertainty is eliminated in a way known as such, by determining the modulation frequencies or modulation periods t for two or more successive minima of the output signal of receiver 12. If a certain multiple gamma gives a minimum with a modulation period t (gamma) and the n-th following multiple (gamma+n) gives a minimum with a modulation period t (gamma+n), the propagation time is in each case $$2T = gamma \cdot t(gamma) = (gamma + n) \cdot t(gamma + n).$$

Therefrom the integer multiple $$gamma = n \cdot t(gamma + n) / [t(gamma) - t(gamma + n)],$$

the time of propagation T=½ gamma t and the measured distance L=cT, where the velocity of the light c depends in a known manner from pressure, temperature and humidity of the air present on the measured path.

The evaluation of the output signal of the photoelectric receiver 12 is done as already mentioned by means of the synchronizing stage 17 and the control stage 16. A synchronous detector of stage 17 in synchronism with the control signal for the frequency modulation of the microwave source 13 samples the output of receiver 12 at any moment when the wobbled modulation frequency for modulator 8 reaches its relative maxima (channel I) and minima (channel II). The synchronous detector holds the sampled values of channels I and II until the respective following values are sampled. By calculating the difference between channels I and II and the mean value of this difference with respect to time, an analog signal is obtained of which the sign indicates the deviation of the output of receiver 12 from a minimum.

This analog signal is fed via a line 18 to an analog-digital converter 19 converting it to a digital 8-bit signal which is then fed to the control stage 16. This control stage 16 is used for control of the frequencies of the microwave source 13 by means of a program, for calculating the characteristic modulation periods t (gamma+n) mentioned above, from the digial 8-bit signal from A/D-converter 19, for output of the measured distance, and for control of the frequency sweep ±5 kHz or ±25 kHz via the synchronizing stage 17 and the microwave source 13.

On the service panel 3 there are further provided switches 20 and 21 for manual selection of modes of operation via the control stage 16. Switch 20 may be used for selecting, as mentioned above, the frequency sweep of ±5 kHz or ±25 kHz for long distances or for smaller ones. Switch 21 has positions OFF, REMOTE, MEASURE, BATTERY-TEST. With switch 21 on position REMOTE, the measurement procedure and output of results may be controlled externally via an ASB (American standard code for information interchange single line bus) 22, with switch 21 on position BATTERY-TEST the voltage of a power supply battery is indicated at an instrument 23. With switch 21 on position MEASURE, the above mentioned deviation of the output signal of receiver 12 from a minimum is displayed at the instrument 23. A digital display 24 is used to indicate the measured distances.

Figure 2:
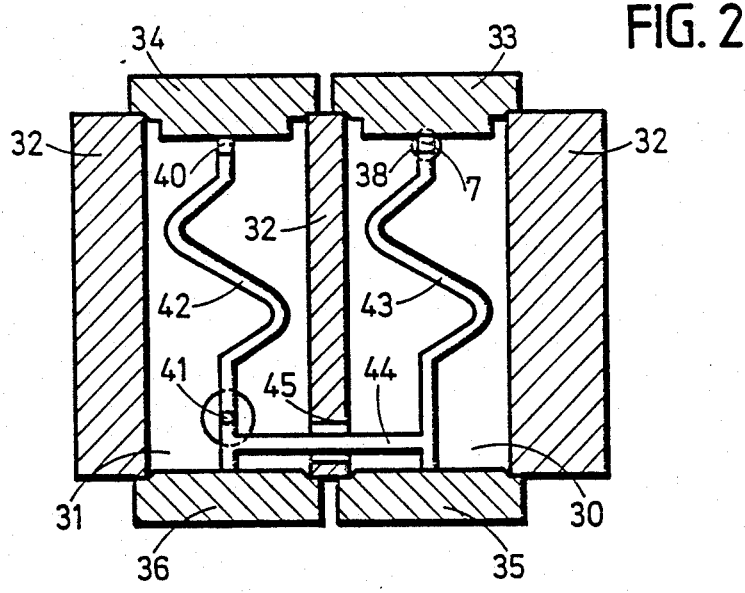
FIG. 2 is a partial cross section of a microwave resonator for use with the apparatus according to FIG. 1.
Figure 3:
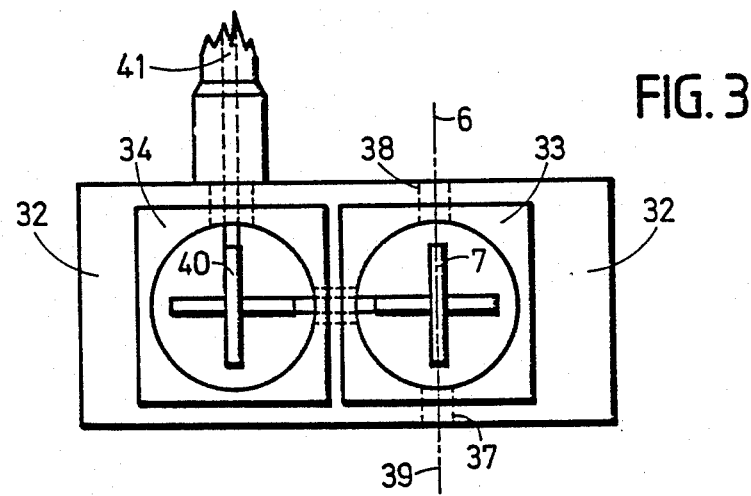
FIG. 3 is a top view of the microwave resonator according to FIG. 2.

As mentioned above, the modulator 8 must accept a series of modulating signals having a rather large range of frequencies, in order to obtain a small relative error of [t (gamma)−t (gamma+n)], gamma, T and L with a given error of measurement of each modulation period t (gamma+n). For processing this frequency range the modulator 8 needs a broad pass band which is obtained by mounting the modulating crystal 7 within a cavity 30 of a microwave line resonator with two coupled cavities 30, 31 as shown in FIG. 2 and FIG. 3. Both cavities 30, 31 of cylindric shape are arranged adjacently within a right parallelepiped block 32, shown in partial section in the side view of FIG. 2. Both cavities are closed by top covers 33, 34 and bottom covers 35, 36. The top covers 33, 34 of quadratic shape are shown in the top view of FIG. 3 as being transparent in order to show the inner parts of cavities 30, 31. Nevertheless, of course the surfaces of the microwave resonator must have metallic conductivity. As shown, the rod-shaped modulating crystal 7 is mounted to the top cover 33 along a diameter of the cavity 30. The narrow beam 6 of laser 1 (see FIG. 1) passes the crystal rod 7 longitudinally by means of two holes 37, 38 of the block 32 along the optical axis 39 (see FIG. 3).

Microwave properties of electrooptic crystals, such as LithiumTantalate show a pronounced dependence upon temperature, this holds in particular for the dielectric constant. In order to avoid detuning between the line resonators 30, 31 due to changes in temperature therefore, a second electrooptic crystal 40 is mounted within the second cavity 31 in a configuration corresponding to crystal 7. Crystal 40 is without optical effect on the beam of laser 1.

High frequency electromagnetic power is fed to the crystals 7, 40 by a line 41 and a system of wire leads 42, 43. By the inductances of wire leads 42, 43 and the capacitances at crystals 7, 40 between the wires 43, 42 and the top covers 33, 34 both line resonators 30, 31 are tuned to the same resonant frequency. The shape of the pass band curve of the resonator system is determined by a coupling branch 44 between wire loops 42 and 43, branch 44 passing through a hole 45 between cavities 30, 31.

Figure 4:
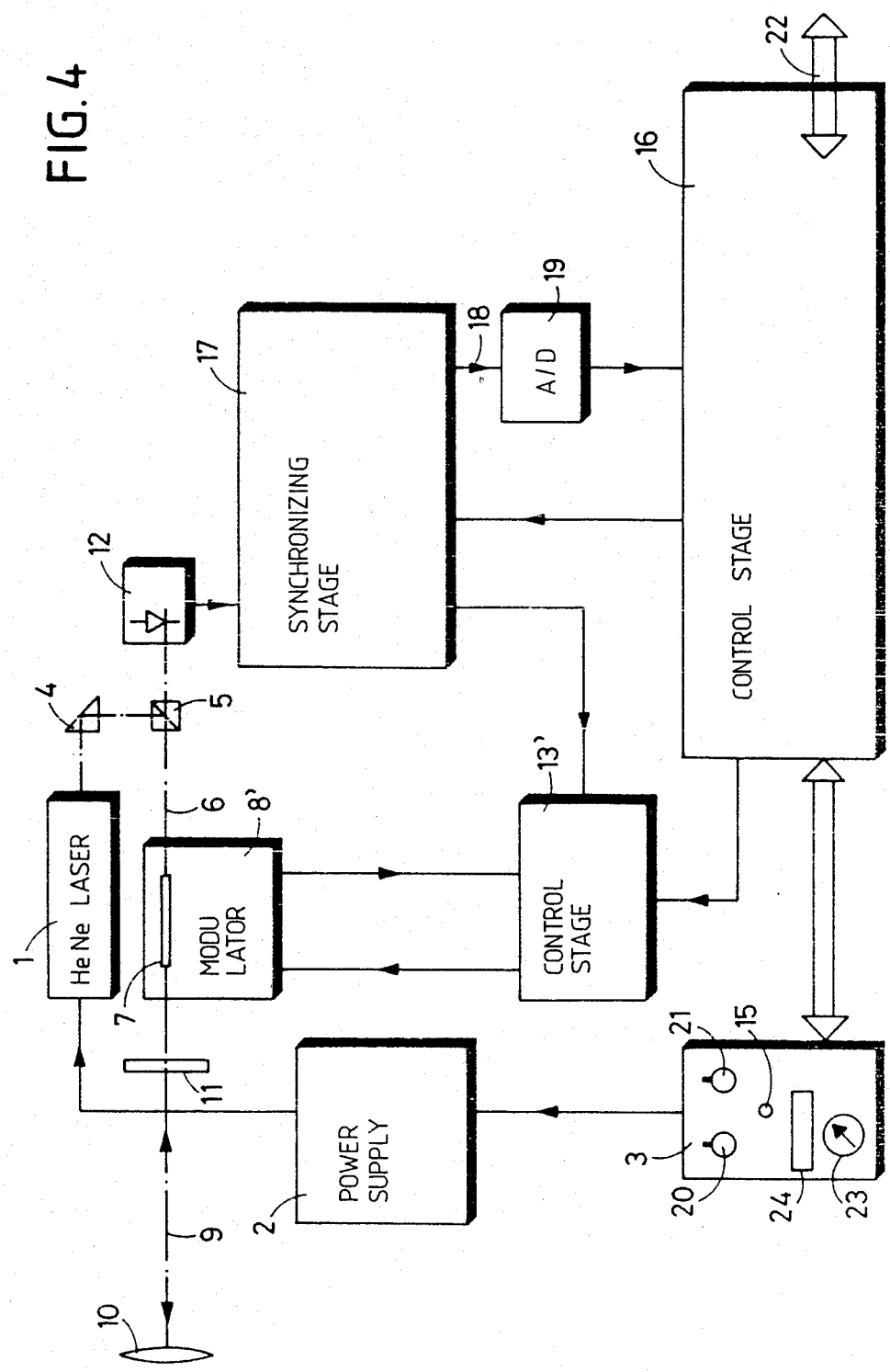
FIG. 4 is a schematic representation of another embodiment of the apparatus according to the invention.

Another more simple arrangement of the modulator 8 for the distance measuring apparatus according to FIG. 1 is shown in FIG. 4, where the elements corresponding to FIG. 1 are designated by the same symbols as in FIG. 1. In FIG. 4, the line resonator is mounted with the microwave source in a common housing and the source is controlled by a control stage within a phase locked loop. The function of the apparatus according to FIG. 4 is essentially equal to the above described function of the device according to FIG. 1. The modulating crystal 7 is mounted within a line resonator being joined to the microwave source within a common modulator 8', as shown more in detail in FIG. 6. The modulation frequencies are selected by means of a control stage 13' forming, together with modulator 8' a phase locked loop (PLL). This control stage 13' is shown more in detail in FIG. 5.

Figure 6:
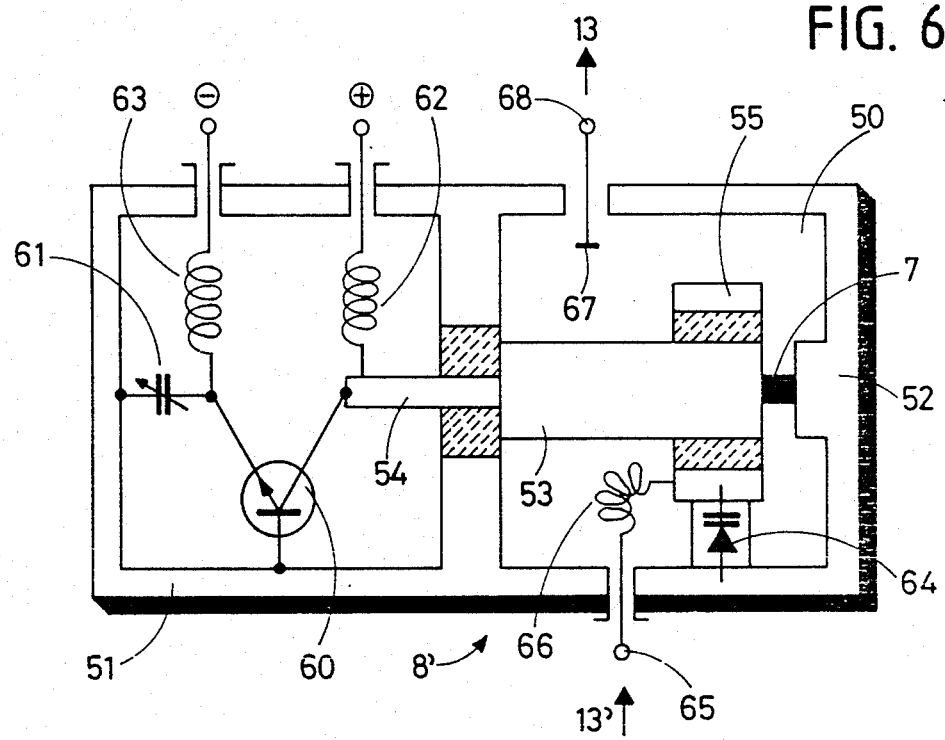
FIG. 6 is a partial cross section of a modulator for use with the apparatus according to FIG. 4.

FIG. 6 shows the modulating crystal 7 in transversal section mounted between an electrically conductive housing 52 and a central conductor 53 arranged electrically isolated with respect to housing 52. Housing 52 and central conductor 53 together constitute the cylindrical line resonator 50 of modulator 8'. The housing 52 has an extension 51 with a transistor 60 and a variable capacitor 61 mounted therein. Transistor 60 and capacitor 61 together with line resonator 50 make up the microwave oscillator effective within modulator 8'. The base of transistor 60 is connected to housing extension 51, while its emitter is connected to extension 51 by means of the capacitor 61 which may be varied between 3-10 pF. The collector directly couples the microwave power generated to an axial extension 54 of the central conductor 53. This oscillator is powered by a d.c. source of which the plus-terminal via a high frequency choke 62 is connected to the collector and the minus-terminal is connected to the emitter of transistor 60 via a high frequency choke 63, as shown.

The frequency of the above described oscillator is controlled by means of a varactor diode 64 connected between the housing 52 and a conductive ring 55 arranged around the central conductor 53 and isolated from the latter. The frequency control signal is fed from the control stage 13' (see FIG. 4) via an input 65 and a high frequency choke 66 to the ring 55. For evaluation of the actual frequency a capacitive probe 67 is connected through housing 52 via output 68 to the control stage 13', thus closing the control loop.

Figure 5:
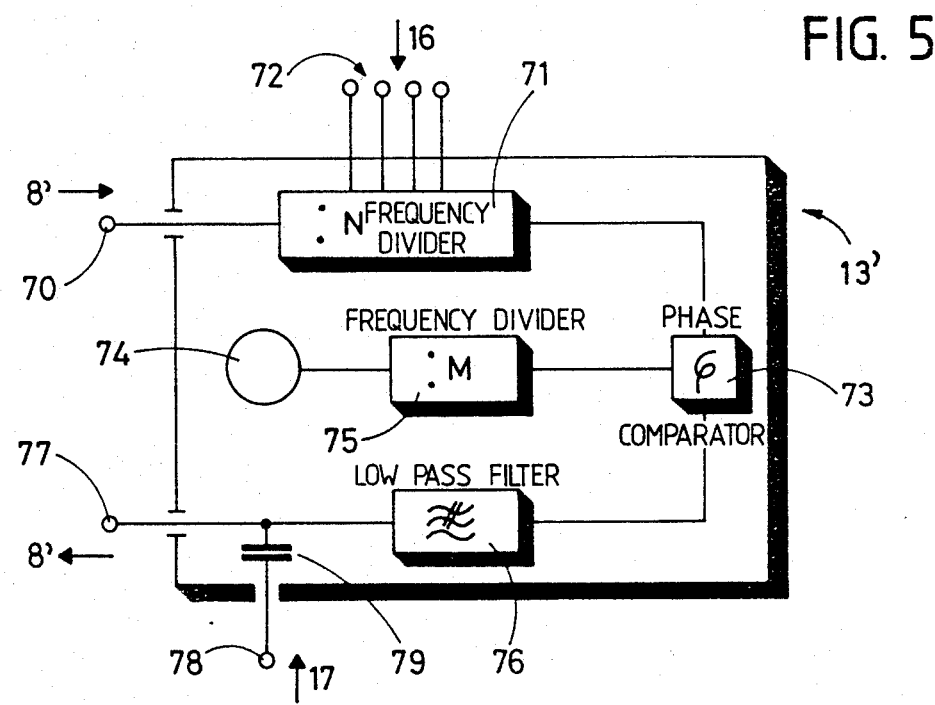
FIG. 5 is a schematic representation of a frequency control stage for use with the apparatus according to FIG. 4.

The control stage 13' is shown more in detail in FIG. 5. A signal having the actual frequency of modulator 8' is fed from its output 68 to an input 70 of a programmable frequency divider 71. The dividing ratio N of divider 71 is controlled by a control signal fed from control stage 16 to a code input 72 of control stage 13'. The frequency divided output of divider 71 is compared by a phase comparator 73 with the output of a stable quartz oscillator 74. This output, prior to comparison is frequency divided at a divider 75 by a ratio of M. The phase comparator 73 generates a d.c. signal with a level given by the phase difference of its two inputs. This d.c. signal passes a low pass filter 76 and is fed from the output 77 of the control stage 13' back to the input 65 of modulator 8'. As easily seen, the frequency of modulator 8' at the line resonator 50 is controlled by a choice of the dividing ratio N of the programmable divider 71 by means of the control stage 16. If at a stable state, the dividing ratio N e.g. is increased, the frequency of the modulator 8' by means of an elevated level of phase comparator 73 output and a capacity change of the varactor diode 64, will be increased until the input phases of comparator 73 are equal again. Thus, by integrating the line resonator 50 into the oscillator circuit 60, 61 there is no need for broadening the pass band of the coupled resonators 30, 31 of FIG. 2 and FIG. 3.

The frequency of the modulation signals controlled by control stage 13' is wobbled as mentioned already in the description of FIG. 1. Therefor a 1 kHz signal from synchronizing stage 17 is added to the d.c. signal at output 77 via an input 78 and a coupling capacitor 79 of control stage 13'.

With the above principles in mind, many embodiments may be realized without leaving the scope of the appended claims. The photoelectric receiver 12 may be a sensitive element with small bandwidth of frequency response, e.g. a PIN diode, a photoelectron multiplier or an avalanche photodiode. In order to obtain a high relative precision of distance measurement, use of a method for compensation of variations of the refractive index of the air may be advantageous such as measurement with two colours (see U.S. Pat. No. 3,424,531). Continuous checking of the stability of buildings, dams or seismically critical regions is conveniently done by programming automatic measurements via the control stage 16 and AS bus 22. In case of shifts alarm functions may be triggered.

Although the present invention has been described in connection with preferred embodiments thereof, many other variations and modifications will now become apparent to those skilled in the art. It is preferred, therefore, that the present invention be limited not by the specific disclosure herein, but only by the appended claims.

What is claimed is:

1. An electrooptical distance measuring apparatus with
    means (1) for generating a collimated bundle of optical radiation (6),
    means (7, 8, 8') for modulating said bundle of optical radiation (6) with a given series of modulation frequencies,
    means (10) for transmitting said modulated bundle of optical radiation (9) over a path the length of which is to be measured,
    a reflecting means for said optical radiation (9) defining the end of said measured path, the beginning of said measured path being defined by said modulating means (7, 8, 8'), and said reflecting means transmitting said modulated bundle of optical radiation (9) back to said modulating means (7, 8, 8'),
    means (13, 13') for generating and selecting (16, 17) modulating frequencies for driving said modulating means (7, 8, 8'),
    a detecting means (12, 16, 17) for determining a given value of the modulation phase of said modulated bundle of optical radiation (9) received at said modulating means (7, 8, 8') relative to that of the radiation when being modulated, and
    means (16) for calculating the measured distance, the improvement comprising
    said modulating means (7, 8, 8') modulating said bundle of optical radiation (6) with an electrooptic crystal (7) and a quarterwave plate (11) matched to a wavelength of optical radiation of said bundle (6), said bundle traversing at first the crystal (7) and then successively the quarterwaveplate (11), twice the measured distance, the quarterwaveplate (11) in reverse direction and finally again the crystal (7).

2. Apparatus as claimed in claim 1, including detecting means (12, 16, 17) for determining those modulation frequencies from said given series which generate a modulation wavelength of said bundle of optical radiation (9) which divides twice the measured distance into an integer number.

3. Apparatus as claimed in claim 1, including a variable path device adapted to form part of the path taken by said modulated bundle of optical radiation, the modulating frequencies from said given series being so chosen that the magnitudes of the successive adjustments of the variable path device necessary for said given value of the relative modulation phase to be indicated are indicative of successive orders of magnitude in the length of the measured distance.

4. An apparatus according to claims 2 or 3, further comprising a polarizing beam splitter (5) mounted between the means (1) for generating a collimated bundle of optical radiation (6) and the electrooptic crystal (7), said bundle (6) upon its first passage of said beam splitter (5) being linearly polarized and after its first and second passage of said quarterwaveplate (11) and of said crystal (7) said bundle (6) being separable from its generating means (1) and being directable onto said detecting means (12).

5. Apparatus as claimed in claim 1, including a first electrooptic crystal (7) arranged in a cavity (30) of a microwave resonator having two coupled cavities (30, 31), the apparatus further including a second electrooptic crystal (40) arranged in the other cavity (31), the tranversal of said bundle of optical radiation (6) occurring through said first crystal only and the second crystal (40) having the same microwave properties as the first crystal (7).

6. Apparatus as claimed in claim 5, in which the first crystal (7) for modulating said bundle (6) and the second crystal (40) both have dielectric constants with the same dependence on temperature.

7. Apparatus as claimed in claim 1, including a crystal (7) for modulating said bundle (6) arranged as a capacitive load within a correspondingly shortened quarterwave line resonator (50), said line resonator (50) being excited by a transistor (60) a.c.-coupled to it, and said line resonator (50) being connected within a phase locked loop (PLL) (64 to 68, 70 to 79) for frequency control.

8. Apparatus as claimed in claim 7, including said quarterwave line resonator (50) in a microwave oscillator effective within said modulating means (8') whereby a transistor (60) and a variable capacitor (61) are arranged in a common housing (50, 51) with the resonator (50) and in close proximity to it.

* * * * *